United States Patent
O'Neal

(10) Patent No.: US 11,918,952 B2
(45) Date of Patent: Mar. 5, 2024

(54) CYCLICAL CO$_2$ CAPTURE WITH INTEGRATED HEAT PUMP

(71) Applicant: ExxonMobil Technology and Engineering Company, Annandale, NJ (US)

(72) Inventor: Everett J. O'Neal, Asbury, NJ (US)

(73) Assignee: EXXONMOBIL TECHNOLOGY AND ENGINEERING COMPANY, Annandale, NJ (US)

( * ) Notice: Subject to any disclaimer, the term of this patent is extended or adjusted under 35 U.S.C. 154(b) by 91 days.

(21) Appl. No.: 17/748,021

(22) Filed: May 18, 2022

(65) Prior Publication Data

US 2023/0372860 A1   Nov. 23, 2023

(51) Int. Cl.
  *B01D 53/04* (2006.01)
  *B01J 20/28* (2006.01)
  *B01J 20/34* (2006.01)

(52) U.S. Cl.
  CPC .... *B01D 53/0438* (2013.01); *B01J 20/28016* (2013.01); *B01J 20/28042* (2013.01); *B01J 20/3483* (2013.01); *B01D 2253/342* (2013.01); *B01D 2257/504* (2013.01); *B01D 2259/4009* (2013.01); *B01D 2259/404* (2013.01)

(58) Field of Classification Search
  CPC ............... B01D 53/04; B01D 53/0438; B01D 2253/342; B01D 2257/504; B01D 2259/4009; B01D 2259/404; B01J 20/28016; B01J 20/28042; B01J 20/3483

USPC .... 95/114, 115, 139, 148; 96/126, 143, 144, 96/145, 146; 423/230

See application file for complete search history.

(56) References Cited

U.S. PATENT DOCUMENTS

| | | | |
|---|---|---|---|
| 6,746,515 B2 | 6/2004 | Wegeng et al. | |
| 8,133,308 B2 | 3/2012 | Lively et al. | |
| 8,784,534 B2 | 7/2014 | Kamakoti et al. | |
| 9,011,583 B2 | 4/2015 | Halder et al. | |
| 2012/0160098 A1 | 6/2012 | Papale | |

(Continued)

OTHER PUBLICATIONS

Plaza, M., G., and Rubiera, F., "Evaluation of a novel multibed heat-integrated vacuum and temperature swing adsorption post-combustion CO2 capture process", Applied Energy, Elsevier, vol. 250, pp. 916-925 (2019).

(Continued)

*Primary Examiner* — Frank M Lawrence, Jr.
(74) *Attorney, Agent, or Firm* — Shook, Hardy & Bacon L.L.P.

(57) ABSTRACT

Systems and methods are provided for performing CO$_2$ sorption and desorption using a sorbent structure with an integrated heat pump. The integrated heat pump can allow at least a portion of the heat generated during sorption to be recovered by forming steam from water. The steam raised during the sorption process can then be compressed and optionally heated to raise the temperature of the steam. The compressed and optionally heated steam can then be used as at least a portion of the steam for desorption of CO$_2$ in the same sorbent bed or a different sorbent bed. By recovering the heat of sorption to raise steam, substantial energy savings can be achieved relative to a conventional process.

20 Claims, 2 Drawing Sheets

(56) References Cited

U.S. PATENT DOCUMENTS

| | | | |
|---|---|---|---|
| 2014/0105809 A1* | 4/2014 | Okumura | B01D 53/04 |
| | | | 422/177 |
| 2017/0106336 A1 | 4/2017 | Boulet et al. | |
| 2017/0203249 A1* | 7/2017 | Gebald | B01D 53/62 |
| 2018/0272266 A1* | 9/2018 | Sprachmann | B01J 20/28011 |
| 2021/0187438 A1* | 6/2021 | Nishibe | B01D 53/83 |
| 2022/0233996 A1* | 7/2022 | Yeganeh | B01D 53/0438 |

OTHER PUBLICATIONS

Song, C., et al., "Design of a low-cost CO2 capture process based on heat integration technology", The 6th International Conference on Applied Energy, (ICAE), vol. 61, pp. 365-368 (2014).
International Search Report and Written Opinion received for PCT Application No. PCT/US2023/022563, dated Sep. 7, 2023, 12 pages.

* cited by examiner

CYCLICAL CO$_2$ CAPTURE WITH INTEGRATED HEAT PUMP

FIELD

Adsorption contactors with integrated management of heat transfer fluids are provided, along with methods for making and using such contactors.

BACKGROUND

Mitigation of CO$_2$ emissions and/or concentrations from various types of CO$_2$ sources (industrial, small-scale, and direct air capture) is an area of ongoing interest. One type of strategy for removing CO$_2$ from a fluid stream is to pass the CO$_2$-containing stream into an amine-plant, where the CO$_2$-containing stream is contacted with a liquid amine. After adsorption of the CO$_2$ by the liquid amine, the amine can be regenerated in a separate process step, and then recycled for further sorption of CO$_2$.

Another type of strategy for mitigation of CO$_2$ emissions is to use an adsorbent or absorbent to remove CO$_2$ from a potential emission gas flow, and then desorb the CO$_2$ as part of a stream that can be processed to reduce, minimize, or eliminate the release of CO$_2$ into the atmosphere. U.S. Pat. Nos. 8,784,534 and 8,858,683 describe examples of methods for adsorption of components from a gas phase stream using a swing adsorption process. Generally, combinations of changes in temperature and pressure can be used for cycling between adsorption/absorption of components from a first process gas stream, and then desorbing the adsorbed components into a purge gas stream. The adsorbed component(s) of interest can then be separated from the purge gas stream.

While the above methods are effective for sorption and desorption of CO$_2$, such conventional methods for performing a sorption/desorption cycle are energy intensive. Both liquid amine sorbents and contactor sorbents typically use at least some swing in temperature as part of the sorption/desorption cycle. For a liquid amine plant, after sorption of CO$_2$ by the amine, the amine can be exposed to steam at a higher temperature to desorb the CO$_2$. The liquid amine is then cooled prior to re-using the liquid amine for another sorption step. Similarly, when using a solid sorbent and/or a sorbent deposited on the surfaces of a solid support structure, the sorption and desorption portions of the process cycle are typically performed at temperatures that differ by 40° C. or more. The heating of such solid sorbents and/or sorbents supported on solid materials (for the desorption step) is typically performed using steam, while cooling can be performed using various types of convenient gas flows. For both amine plant and solid sorbent types of processes, the steam needed for managing the sorbent temperature during the sorption/desorption cycle represents a substantial energy cost per CO$_2$ molecule that is sorbed. This cost is still higher when the initial CO$_2$-containing stream corresponds to a relatively dilute stream, such as a stream containing 5.0 vol % or less of CO$_2$.

What is needed are systems and methods that can reduce or minimize the energy costs associated with performing a CO$_2$ sorption/desorption cycle.

U.S. Patent Application Publication 2012/0160098 describes a system for CO$_2$ sorption and desorption that allows for heat transfer between sorbent beds so that heat generated during sorption from one bed can be used to provide heat for a second bed where desorption is being performed. In one aspect, the heat transfer between the two beds is performed in the manner of a heat pump, where a refrigerant is used to transfer the heat from a first bed to a second bed. Additionally, during the desorption step, the pressure of the desorption environment is reduced to facilitate removal of CO$_2$ from the sorbent. The temperature of the beds during the full sorption/desorption cycle is described as being between 15° C. and 80° C.

U.S. Pat. No. 8,133,308 describes sorbent fiber compositions that can be used in a temperature swing adsorption process. Arrangement of a plurality of sorbent fibers in an apparatus is also described. The sorbent fibers correspond to a polymer matrix with adsorbents supported in the polymer matrix. A central lumen of the fiber is sealed off from the polymer matrix by a barrier layer. In some aspects, a plurality of the sorbent fibers can be arranged in an apparatus for adsorption of a component (such as CO$_2$) from a gas phase flow. In such aspects, a plurality of fibers are included within a vessel. Process gas can be passed into the vessel through slots in the exterior of the vessel in a cross-flow manner. After adsorption of a desired component, the remainder of the process gas can enter a central channel for exhaust from the vessel. A header at the end of the vessel can be used to pass a heat transfer fluid through the central lumens of one or more of the fibers, so that process gas does not mix with heat transfer fluid. It is noted that the flow path for process gas is defined at least in part by the shape of the vessel that is used to contain the plurality of fibers, as the vessel walls provide at least part of the containment that forces the process gas to flow toward the central exhaust channel of the vessel.

U.S. Pat. No. 8,673,059 describes temperature swing adsorption contactors for gas separation. The contactors include a support material that can correspond to either a sorbent material or serve as a support for a sorbent material. The contactors further include microtubes, supported on or between layers of the support material. The microtubes can carry heat transfer fluid for temperature management.

U.S. Pat. No. 9,011,583 describes a monolith type structure containing a plurality of fluid flow channels. The monolith can be used as part of the adsorbent contactor. During operation, a separate cap or top structure can be placed on top of the monolith to block entry of process gas to selected channels. The selected channels can then be used for transport of a heat transfer fluid during operation. The top structure also assists with defining a header for introducing the heat transfer fluid into the selected channels in the monolith without introducing the heat transfer fluid into the channels containing the process gas flow. This can be achieved in part by removing walls from some of the selected channels, so that the selected channels are in fluid communication in the header area defined by the combination of the monolith and the top structure. The selected channels can also include a coating to prevent heat transfer fluid from leaving the selected channels.

U.S. Pat. No. 6,746,515 describes adsorption systems that can be constructed in a modular manner. The modular adsorption systems correspond to a plurality of layers that are constructed to allow heat transfer fluid layers to be arranged above and/or below layers of adsorbent. The modular adsorption systems can be constructed using shims, so that desired materials can be selected for each type of layer in the modular system.

SUMMARY

In an aspect, a method for performing a CO$_2$ sorption/desorption cycle is provided. The method includes exposing $CO_2$ to a sorbent in a first sorbent environment to sorb $CO_2$ and generate heat at a sorption temperature. The method further includes transferring at least a portion of the heat generated at the sorption temperature to water in one or more first heat exchanger volumes associated with the first sorbent environment to form steam at the sorption temperature. The method further includes compressing at least a portion of the steam to form pressurized steam. The method further includes passing at least a portion of the pressurized steam into one or more second heat exchanger volumes associated with a second sorbent environment. The method further includes condensing the at least a portion of the pressurized steam in the second heat exchanger volumes at a desorption temperature to form water and generate heat at the desorption temperature. Additionally, the method includes transferring at least a portion of the heat generated at the desorption temperature to a sorbent in the second sorbent environment to desorb $CO_2$.

DETAILED DESCRIPTION

Figure 1:
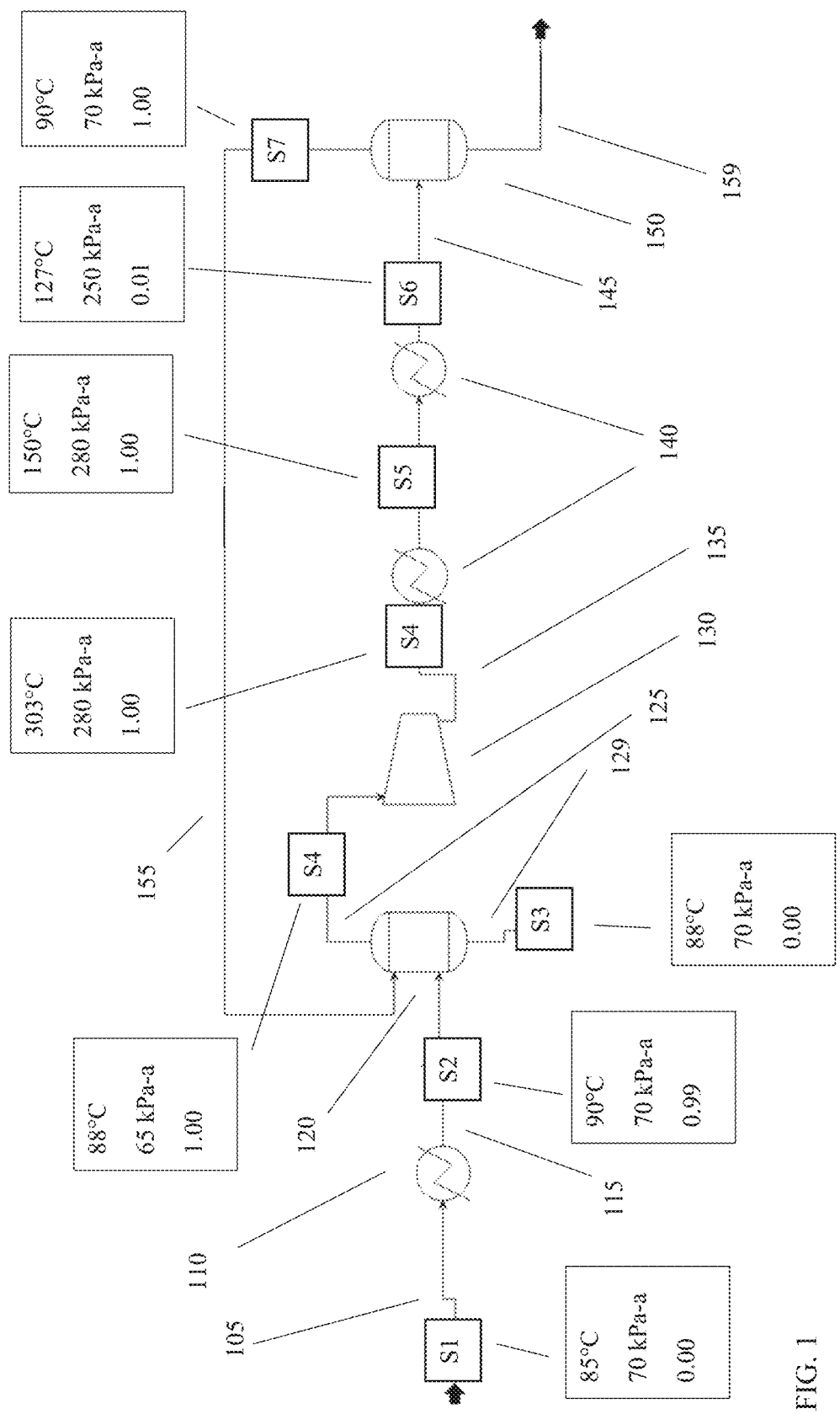
FIG. 1 shows an example of a process flow for forming steam during a sorption step and using the steam to provide heat for a desorption step.

All numerical values within the detailed description and the claims herein are modified by "about" or "approximately" the indicated value, and take into account experimental error and variations that would be expected by a person having ordinary skill in the art.

Overview

In various aspects, systems and methods are provided for performing $CO_2$ sorption and desorption using a sorbent structure with an integrated heat pump. During sorption of $CO_2$ by a sorbent, a substantial amount of heat is generated as heat is released during the sorption process. The integrated heat pump can allow at least a portion of this heat to be recovered by forming steam from water. The steam raised during the sorption process can then be compressed (and optionally heated prior to compression) to raise the temperature of the steam. The compressed and optionally heated steam can then be used as at least a portion of the steam for desorption of $CO_2$ in the same sorbent bed or a different sorbent bed. By recovering the heat of sorption to raise steam, substantial energy savings can be achieved relative to a conventional process.

Conventionally, $CO_2$ sorption/desorption cycles that incorporate a temperature swing tend to have relatively high energy costs. This is due in part to the amount of steam consumed during a sorption/desorption cycle, and also due in part to the difficulties in recovering large portions of the heat involved in the sorption/desorption cycle.

With regard to heat management, a sorption/desorption cycle poses a variety of challenges. First, the sorption step takes place at a lower temperature than the desorption step. Thus, even though heat is generated during the sorption step, it is difficult to meaningfully recover this heat for use, as the desorption step (where additional heat is needed) is performed at a higher temperature. Although the desorption step is at higher temperature, it is also difficult to recover heat from this step using conventional methods. This is due to the fact that sorbent beds are typically heated using the sweep gas that assists with desorption of $CO_2$. During desorption, the sweep gas acquires a meaningful $CO_2$ content, and therefore the $CO_2$ needs to be recovered from the sweep gas flow before the sweep gas could be used to transfer heat to another sorbent bed. As a practical matter, the steps for recovering $CO_2$ from the sweep gas hinder the recovery of any heat from the sweep gas stream.

The other difficulty is that steam is commonly used as the sweep gas for the desorption step in the process cycle. Steam has a variety of advantages for use as a sweep gas. Steam can be readily formed and heated to a target temperature that matches a desired desorption temperature. The steam is also readily separated from $CO_2$ after desorption, since the water can be condensed out, leaving behind a relatively high purity $CO_2$ stream. However, formation of even low pressure steam requires a substantial amount of energy.

In various aspects, one or more of the above difficulties related to energy usage during a $CO_2$ sorption desorption cycle can be reduced or mitigated by performing $CO_2$ capture using a sorbent bed that is integrated with a heat pump. The integrated heat pump is configured to recover heat during the sorption portion of the process cycle by using a portion of the heat of sorption to raise steam. It is noted that in some aspects, steam is generated by using water at a pressure below 100 kPa-a as the heat transfer fluid. This allows steam to be generated at a target sorption temperature, which may be below 100° C.

After recovering a portion of the heat of sorption as steam, the resulting steam can be used in several manners. First, at least a portion of the steam can be compressed, resulting in an increase in both the pressure and temperature of the steam. Optionally, the steam can be heated before compression. Optionally, heating could also be performed after compression in place of or in addition to heating prior to compression, if for some reason heating after compression is more convenient. The pressurized steam can then be used as a heating fluid for another sorbent bed that is in the desorption phase of the process cycle. By optionally heating and pressurizing the steam, the temperature of the steam can be raised to the target desorption temperature. The pressurized steam can then be used as heat transfer fluid. It is noted that condensing the steam back to water at the target temperature can allow a relatively small amount of steam to provide a substantial amount of heat transfer for the sorbent be that is undergoing the desorption step. Another use for the steam is to use a portion of the steam as a sweep gas during various portions of the process cycle. This can include use as a sweep gas for a sorbent bed that is in the desorption phase, or use as a sweep gas for an intermediate/transition step in the process cycle, such as a purge after the sorption step but prior to the desorption step.

It has been discovered that by capturing heat from the sorption bed by converting water to steam, and then using the steam in various manners, substantial cost savings can be achieved relative to simply generating new steam to provide all of the steam needed for a sorption/desorption cycle. These savings are achieved in part by using the phase transition from water to steam and then back to water as part of the heat transfer process.

Part of what enables the process is the formation of steam during heat recovery form a sorbent bed during the sorption step. Simply capturing the heat from the sorbent bed using liquid phase water would be of little value. In particular, typical sorbents for $CO_2$ capture require temperatures greater than 100° C. to cause substantial desorption of $CO_2$ at pressures near 100 kPa-a. Thus, even if liquid water was used to recover heat from a sorbent bed, that water would need to be converted to steam to be useful during the desorption step. As noted above, the generation of steam requires substantial energy input, and simply recovering heat in liquid water does not avoid this energy cost. Additionally, attempting to use already generated steam as the heat transfer fluid would not generate energy savings. Although the pressure of steam could be reduced to allow for use as a heat transfer fluid during a sorption process, the heat capacity of steam is relatively low. Thus, a large volume of steam would be needed to transfer heat from the sorption step to the desorption step. Any energy savings from capturing the heat of sorption would be lost due to high compression costs for raising the pressure/temperature of the steam so that it could be used to provide heat to a desorption step.

By contrast, using the heat of sorption to form steam from liquid water allows for efficient heat transfer and generation of steam while avoiding excessive compression costs. The specific heat of vaporization for water is roughly 80 times higher than the specific heat for raising the temperature of steam. Thus, by capturing a substantial portion of the heat for transfer in the form of the vaporization phase transition, the volume of steam that needs to be compressed can be reduced by roughly a similar factor of 80. Thus, a smaller amount of compression energy can be used to convert low pressure, low temperature steam recovered during a sorption step into higher pressure, higher temperature steam for providing heat to a desorption step.

It is noted that some energy is required for operation of the heat pump. This energy primarily corresponds to the energy for operation of the compressor(s) for pressurizing the steam, although some energy may also be used for heating prior to compression. Typically, a compression stage is operated based on electrical power, so the electrical power consumed by compression can somewhat offset the benefit of recovering heat from the sorption step in the form of steam. However, even after factoring in the energy required for operating the heat pump, substantial energy savings can still be achieved. Depending on the aspect, the ability to recover at least a portion of the heat of sorption during the sorption step in the form of steam can provide a net energy savings corresponding to 5% or more of the total energy required for steam production in the process, or 10% or more of the total energy, or 20% or more of the total energy, such as up to saving 50% or more of the total energy required for steam production, or possibly still higher. It is noted that still further benefits can be achieved if the electricity for operating the compressors of the heat pump is derived from a renewable source.

Definitions

In this discussion, a sorbent environment is defined as a sorbent, any support that is used for supporting a sorbent, and any gas phase environment associated with the sorbent based on the gas phase environment being present within the same enclosure as the sorbent. During a sorption step, a $CO_2$-containing gas can be introduced into the gas phase environment associated with the sorbent to allow for sorption of $CO_2$. During desorption, a purge gas or sweep gas can be introduced into the gas phase environment associated with a sorbent to assist with removing $CO_2$ from the sorbent environment as the $CO_2$ desorbs from the sorbent.

In this discussion, a sorbent environment can have one or more associated heat exchanger volumes. It is noted that a single heat exchanger volume can be associated with more than one sorbent environment. An associated heat exchanger volume for a sorbent environment corresponds to a volume that is in sufficient proximity to allow for heat transfer, but that is not in fluid communication with the sorbent environment during a sorption step or a desorption step. This allows water or steam to be maintained in the associated heat exchanger volume without introducing such water or steam directly into the sorbent environment (i.e., there is no contact between water or steam from the heat exchanger volume and the sorbent in the associated sorbent environment). It is noted that the lack of fluid communication between the sorbent environment and the associated heat exchanger volume(s) can be due to the presence of closed valves. Thus, it may be possible to create a pathway for fluid communication between a sorbent environment and an associated heat exchanger volume during time periods when the sorbent environment is not performing a sorption step or a desorption step.

In this discussion, sorption is defined as including both adsorption and absorption. Adsorption refers to physical association of a component with a surface or active site, such as physisorption of $CO_2$ on a solid surface. Absorption corresponds to a physical or chemical incorporation of component into a different phase, such as incorporation of gas phase $CO_2$ into a complex with a liquid phase amine. Desorption is defined as separation of an adsorbed or absorbed component from the adsorption surface or absorption phase.

In this discussion, the terms "water" and "steam" are used to refer to the specific phase of $H_2O$. Unless otherwise specified, "water" refers to liquid water, while "steam" refers to vapor phase water.

In this discussion, a zeotype is defined to refer to a crystalline material having a porous framework structure built from tetrahedra atoms connected by bridging oxygen atoms. Examples of known zeotype frameworks are given in the "Atlas of Zeolite Frameworks" published on behalf of the Structure Commission of the International Zeolite Association", $6^{th}$ revised edition, Ch. Baerlocher, L. B. McCusker, D. H. Olson, eds., Elsevier, New York (2007) and the corresponding web site, http://www.iza-structure.org/databases/. Under this definition, a zeolite refers specifically to an aluminosilicate having a zeotype framework structure. Under this definition, a zeotype can refer to aluminosilicates (i.e., zeolites) having a zeotype framework structure as well as crystalline structures containing oxides of heteroatoms different from silicon and aluminum. Such heteroatoms can include any heteroatom generally known to be suitable for inclusion in a zeotype framework, such as gallium, boron, germanium, phosphorus, zinc, and/or other transition metals that can substitute for silicon and/or aluminum in a zeotype framework. It is noted that under this definition, a zeotype can include materials such as silicoaluminophosphate (SAPO) materials or aluminophosphate (AlPO) materials.

Sorption/Desorption Cycle—General

In various aspects, energy savings are realized based on integration of a heat pump with sorbents used for a $CO_2$ sorption/desorption cycle. As a practical matter, a configuration for performing a $CO_2$ sorption/desorption cycle as described herein will typically include a plurality of sorbent environments. During operation, the timing of the sorption/desorption cycle can be offset in at least a portion of the sorbent environments, so that the sorbents in one or more sorbent environments can perform a sorption step during a time period when the sorbent in at least one other sorbent environment is performing another step in a process cycle, such as a desorption step. Thus, as steam is generated during a sorption step for one or more first sorbent beds that steam can then be compressed and passed into at least one second sorbent environment for use as a purge gas, to provide heat for desorption, or a combination thereof.

The sorption/desorption process cycle can be performed using corresponding sorbent configurations that allow for sufficient heat transfer surface area between the sorbents and heat transfer fluid (e.g. water) that is in heat exchanger volumes associated with the sorbents. Valves can be used to control the available flow paths for water/steam in the system, so that as sorbents pass through the various stages of the sorption/desorption process cycle, the flows within the heat exchanger volumes can be changed to provide the appropriate fluid to the heat exchanger volumes (e.g., provide water to heat exchanger volumes associated with a bed in a sorption step, provide steam to a heat exchanger volume associated with a sorbent in a desorption step).

Sorption/Desorption Cycle—Sorption Step and Steam Generation

A general sorption/desorption cycle for $CO_2$ capture can include several types of steps. Depending on the aspect, the steps can include a sorption step; a purge step; a desorption step; and a temperature adjustment step or cooling step to return a sorbent to an appropriate temperature for the beginning of the next sorption step. While only the sorption step and desorption step are required, as a practical matter, including the purge step and/or the temperature adjustment step can often result in improved $CO_2$ capture efficiency. In various aspects, each of the steps in the sorption/desorption cycle can be modified and/or improved by integrating steam generation into the process cycle.

The initial step of a sorption/desorption cycle is a sorption step. During a sorption step, a sorbent is exposed to $CO_2$ under conditions for sorption of $CO_2$ by the sorbent. Various types of convenient $CO_2$-containing streams can be used, such as flue gases from combustion processes. The $CO_2$-content of a $CO_2$-containing stream can vary widely, ranging from 1.0 vol % to 40 vol % or possibly still higher.

For many types of sorbents, the temperature of the sorbent during exposure to a $CO_2$-containing stream can substantially impact the amount of $CO_2$ that is sorbed. Thus, a given type of sorbent will often have a target range of temperatures that allow good sorbent capacity during sorption while also allowing for relatively rapid sorption of $CO_2$. Generally, the sorption step can be performed at temperatures of the sorbent and/or in the sorbent environment of 30° C. to 150° C., or 30° C. to 120° C., or 50° C. to 150° C., or 50° C. to 120° C. In some aspects, a sorbent can be used where the temperature during the sorption step is less than 100° C. In such aspects, the temperature of the sorbent and/or the sorbent environment during the sorption step and/or at the end of the sorption step can be 30° C. to 99° C., or 50° C. to 99° C., or 30° C. to 80° C., or 50° C. 0 to 80° C., or 30° C. to 65° C. In other aspects, at least a portion of the sorption step can be performed at temperatures of 100° C. or more. In such aspects, the temperature during at least a portion of the sorption step and/or at the end of the sorption step can be 100° C. to 150° C., or 100° C. to 120° C., or 120° C. to 150° C.

The sorption of $CO_2$ can generally be performed at pressures at or above ambient. In some aspects, the total pressure in the sorbent environment during a sorption process can be 100 kPa-a or more, or 110 kPa-a or more, such as up to 2.0 MPa-a or possibly still higher. It is noted that if a low pressure $CO_2$-containing stream was available, a sorption process could be performed at a pressure of 90 kPa-a or less, but generally lower pressures will reduce sorption, and in most instances allowing a reduced pressure gas to expand to roughly ambient pressure requires little or no additional energy cost.

During a sorption process, the flow rate of $CO_2$-containing gas can be any convenient flow rate that reduces or minimizes $CO_2$ breakthrough while the sorbent still has available sorption capacity. In other words, the flow rate can be selected so that kinetic considerations do not prevent substantially complete sorption of $CO_2$ while the sorbent still has available capacity. Breakthrough of $CO_2$ can be defined in various ways, but generally corresponds to a drop in the percentage of the input $CO_2$ that is sorbed by the sorbent. In some aspects, breakthrough can be defined as sorption of 95 vol % or less of the $CO_2$ in a $CO_2$-containing flow, or 90 vol % or less, or 85 vol % or less, such as down to 75 vol % or less or possibly still lower. It is noted that the flow rate can be dependent on the size and number of sorbent environments that are used for processing a $CO_2$-containing gas. Large furnaces can generate millions of standard cubic feet per day of flue gas, while a power plant could generate a billion standard cubic feet per day or more. A large plurality of sorbent environments operating in parallel would be needed to process such sources of flue gas.

Regardless of the type of sorbent, the nature of a $CO_2$ sorption process results in generation of heat during the sorption step. When capturing $CO_2$ using a conventional sorbent bed, this will result in a temperature increase for the sorbent environment during the sorption step. In various aspects, this temperature increase in the sorbent environment can be reduced or minimized when sorption is performed using a sorbent environment with an integrated heat pump. Instead of allowing the temperature of the sorbent environment to increase as the heat of sorption is released during a sorption step, one or more associated heat exchanger volumes can be provided in thermal proximity to the sorbent of the sorbent environment. At least a portion of the heat of sorption that is released is transferred to water present within the associated heat exchanger volume(s). The water in the heat exchanger volumes is at roughly the target sorption temperature for the sorbent and/or sorbent environment. The pressure of the water is selected so that the partial pressure of the water is roughly equal to the vapor pressure of water at the temperature of the sorbent environment. In other words, the water in the associated heat exchanger volume(s) is at the "boiling point" for water under the temperature and pressure conditions present in the associated heat exchanger volume(s). As a result, when heat of sorption is released during the sorption step, the heat is at least partially used to convert the water (liquid phase) in the associated heat exchanger volume(s) into steam at the temperature and pressure in the heat exchanger volumes. Thus, steam is formed at the temperature used for the sorption step in the sorption/desorption cycle. Because the amount of steam raised based on the heat of sorption is proportional to the amount of $CO_2$ sorbed during the sorption step, the amount of steam raised is similarly proportional to the amount of steam that is needed for other later steps in the sorption/desorption process cycle.

Generally, the temperature of the water provided to the one or more associated heat exchanger volumes during the sorbent step can be a temperature that roughly corresponds to the target temperature for the sorbent/sorbent environment during the sorption step. Thus, the temperature of the water introduced into the heat exchanger volumes can be 30° C. to 150° C., or 30° C. to 99° C., or 50° C. to 99° C., or 30° C. to 90° C., or 50° C. to 90° C., or 30° C. to 80° C., or 50°

C. to 80° C., or 30° C. to 65° C., or 100° C. to 150° C., or 100° C. to 120° C., or 120° C. to 150° C.

Generally, the pressure in the one or more associated heat exchanger volumes can roughly correspond to the pressure for converting water into steam at the temperature of the water in the associated heat exchanger volumes. In aspects where the temperature at the end of the sorption step is 99° C. or less, the temperature of the steam generated during the sorption step will also be 99° C. or less. In order to form such steam, the pressure in the associated heat exchanger volume (s) needs to be less than 101 kPa-a. In such aspects, the pressure in the heat exchanger volumes can be 40 kPa-a to 100 kPa-a, or 60 kPa-a to 100 kPa-a, or 80 kPa-a to 100 kPa-a, or 40 kPa-a to 90 kPa-a, or 60 kPa-a to 90 kPa-a, or 40 kPa-a to 75 kPa-a. In other aspects where the temperature at the end of the sorption step is 100° C. or higher, the pressure in the associated heat exchanger volumes can be 101 kPa-a or more, such as 101 kPa-a to 1500 kPa-a.

It is noted that heat transfer between the sorbent and the associated heat exchanger volume(s) will typically be constrained by practical limitations, and therefore some heat will remain to heat the sorbent and/or sorbent environment. Thus, during the sorption step, the temperature of the sorbent/sorbent environment may be higher than the temperature of the water/steam within the one or more associated heat exchanger volumes.

In some aspects, because of the presence of the associated heat exchanger volumes, the temperature within the sorbent environment can optionally be maintained at a roughly constant value during at least a portion of the sorption step. In some aspects, the temperature of the exhaust gas exiting from the sorbent environment at the start of the sorption step can differ from the temperature of the exhaust gas exiting from the sorbent environment at the end of the sorption step by 10° C. or less, or 5.0° C. or less, such as down to substantially no change in temperature between the start of the sorption step and the end of the sorption step. Additionally or alternately, the average temperature of the sorbent environment can be roughly maintained during the sorption step. For this type of characterization, the average temperature of the sorbent environment can be characterized based on the average of a) the temperature of gas entering the sorbent environment and b) the temperature of the gas exiting from the sorbent environment. In such aspects, the average temperature of the sorbent environment at the start of the sorption step can differ from the average temperature of the sorbent environment at the end of the sorption step by 10° C. or less, or 5° C. or less, such as down to substantially no change in the average temperature of the sorbent environment.

In some aspects, some heating of the sorbent environment may occur during the sorption step. Even though the temperature of the sorbent environment at the end of a desorption step is typically higher than the target temperature of the sorbent environment for performing sorption, some process cycles may cool the sorbent environment to a temperature below the target sorption temperature prior to the start of the sorption step. In this type of aspect, the temperature of the water in the associated heat exchanger volume(s) may correspond to the target temperature for sorption, but the sorbent environment may not reach the target temperature for sorption until after the beginning of the sorption step.

The end of a sorption step can be defined in various manners. In some aspects, a sorption step can be performed until breakthrough is detected, such as by analyzing the $CO_2$ content of the exhaust stream exiting from the sorbent environment. In other aspects, the sorption step can be performed based on a fixed value, such as performing a sorption step for a fixed amount of time, performing a sorption step until a fixed amount of the $CO_2$-containing stream has been introduced into the sorbent environment, or another convenient condition. Such a condition could be selected, for example, based on performing test runs to determine when breakthrough occurs relative to the length of the sorption step and/or the volume of $CO_2$-containing gas introduced into the sorbent environment.

Sorption/Desorption Cycle—Pressurizing of Steam

After forming steam by using a portion of the heat of sorption from a sorption step, a compressor, pump, and/or other type of compression stage can be used to increase the pressure of the steam. In aspects where steam is formed at a pressure of 100 kPa-a or less, multiple stages of compression may be desirable. For example, a first compression stage can be used to increase the pressure of the steam to a pressure of 101 kPa-a or higher so that the steam can be used as a purge or sweep gas. A second compression stage can be used to increase the pressure and temperature of a portion of the steam to higher values so that the steam can be used to provide heat for a desorption step. In other aspects, the steam generated during a sorption step can be used as a sweep gas or purge gas without further compression. More generally, any convenient number of compression stages can be used to generate steam at a desired temperature and/or pressure for various uses in a sorption/desorption process cycle.

In some aspects, one or more portions of the steam generated during the sorption step can be pressurized to a pressure of 101 kPa-a to 500 kPa-a, or 101 kPa-a to 350 kPa-a, or 101 kPa-a to 250 kPa-a. In various aspects, at least a portion of the steam generated during the sorption step can be pressurized to a pressure of 150 kPa-a to 1500 kPa-a, or 150 kPa-a to 1000 kPa-a, or 150 kPa-a to 750 kPa-a, or 150 kPa-a to 500 kPa-a, or 250 kPa-a to 1500 kPa-a, or 250 kPa-a to 1000 kPa-a, or 250 kPa-a to 750 kPa-a, or 500 kPa-a to 1500 kPa-, or 500 kPa-a to 1000 kPa-a. Generally, the pressure for at least a portion of the steam is selected to correspond to the pressure where steam condenses at the target desorption temperature in a desorption step.

Pressurizing of the steam also results in an increase in the temperature of the steam. It is noted that this compression will generally result in formation of pressurized steam at a temperature greater than the condensation temperature at the corresponding pressure. In some aspects, one or more portions of the steam generated during the sorption step can have a temperature after pressurization of 100° C. to 500° C., or 100° C. to 400° C., or 100° C. to 300° C., or 100° C. to 200° C., or 150° C. to 500° C., or 150° C. to 400° C., or 150° C. to 300° C., or 200° C. to 500° C., or 200° C. to 400° C., or 300° C. to 500° C. It is noted that heating can also be performed prior to and/or after pressurization. The temperatures after pressurization described herein include any heating that is performed on the pressurized steam prior to compression to form the pressurized steam. Such heating can be performed in any convenient manner such as by electrical heating, heat exchange, or another convenient heating method.

In some aspects, the amount of compression can vary as steam is passed into a desorption step. For example, at the beginning of a desorption step, a sorbent environment can be at a lower temperature. Thus, lower temperature steam can initially be useful for increasing the temperature of the sorbent environment. Later in the desorption step, more pressurization can be used to provide higher temperature steam in order to achieve the final target temperature for the desorption step in the sorbent environment. In still other aspects, any other convenient types of variation in pressurization levels can be used to provide steam at various temperatures for use in the sorption/desorption cycle. As another example, a first compression stage can be used to partially pressurize steam to a temperature suitable for use as a purge gas, while a second compression stage can form steam for use in an associated heat exchanger volume during a desorption step. In some aspects where pressurization is used to form steam at different combinations of temperature and pressure, at least a portion of the steam generated during the sorption step can have a temperature after pressurization of 100° C. to 200° C., or 100° C. to 180° C., or 100° C. to 160° C., or 120° C. to 200° C., or 120° C. to 180° C., or 140° C. to 200° C.

Sorption/Desorption Cycle—Optional Purge Step

After the sorption step, an optional purge step can be performed. A purge step can perform one or more functions for a sorption/desorption process cycle. One function of a purge step can be to prepare a sorbent environment for increased temperatures. For example, some types of sorbents for $CO_2$, such as amine-based sorbents, can be sensitive to conditions where a sufficient amount of $O_2$ is present in the sorbent environment in combination with a sufficiently high temperature. One common type of $CO_2$-containing stream is a flue gas from a power plant, such as a flue gas from a natural gas power plant. The flue gas from a power plant can potentially contain 1.0 vol % to 15 vol % of $O_2$, depending on the operating conditions for the combustion reaction. When a $CO_2$-containing gas is processed that contains $O_2$, a purge step may be desirable to reduce the $O_2$ concentration in the sorbent environment to a sufficiently low level prior to increasing the temperature of the sorbent environment. Another potential function of a purge step can be to perform some heating of the sorbent environment prior to the start of the desorption step. Still another potential function of a purge step can be to remove any remaining $CO_2$ contained in the sorbent environment in a controlled manner prior to starting the desorption process.

In some aspects, a portion of the steam generated during the sorption step can be used as the purge gas for the optional purge step. The steam used in the optional purge step can be any convenient steam that is available. Thus, if some steam is available at lower pressure and/or temperature, such steam can be used. In some aspects, the steam used in the purge step can have a pressure of 101 kPa-a to 1500 kPa-a, so that any available steam can be used. In other aspects, the steam used in the purge step can have a pressure of 101 kPa-a to 500 kPa-a, or 101 kPa-a to 350 kPa-a, or 101 kPa-a to 250 kPa-a. In such aspects, the steam used in the purge step can have a temperature of 100° C. to 140° C., or 100° C. to 120° C.

Sorption/Desorption Cycle—Desorption Step

After any optional purge step, a desorption step can be performed to desorb $CO_2$ that has been sorbed by the sorbent. To perform desorption, the temperature of the sorbent and/or sorbent environment is increased to a target desorption temperature while a sweep gas is typically passed over the sorbent to sweep away $CO_2$ as it is released. Conventionally, this sweep gas can be steam, so that the sweep gas also provides heat for raising the temperature of the sorbent to the desorption temperature. Other gases such as $N_2$ can also be used as a sweep gas/as a temperature adjustment gas, but the heat capacity of $N_2$ is generally lower than the heat capacity of steam, so a larger flow rate is needed in order to achieve the same level of temperature management. It is noted that when steam is passed into a conventional sorbent environment during a desorption step, the steam is maintained at a temperature above the condensation point for the pressure in the sorbent environment. This avoids condensation in the presence of the sorbent. For many types of sorbents, exposing the sorbent to liquid water can result in a variety of problems, such as blocking of pores within a sorbent structure and/or degradation of the sorbent.

In contrast to a conventional sorption/desorption cycle, in various aspects, at least a portion of the steam generated during the sorption step (after pressurization) can be passed into heat exchanger volumes associated with the sorbent in the desorption step. By passing the steam into the heat exchanger volume(s) associated with the sorbent, the steam can be condensed without impacting the sorbent. This means that the heat of condensation can be used for heating of the sorbent environment, as opposed to simply heating the environment based on heat transfer from the steam without a phase change. This can substantially increase the amount of heat that is ultimately transferred from the sorption step to the desorption step.

In some aspects, an additional portion of the steam generated during the sorption step can be used as at least part of a sweep gas and/or a temperature adjustment gas. In this type of aspect, the steam can be at a temperature above the condensation point for steam at the pressure in the sorbent environment, so that condensation in the presence of the sorbent is reduced, minimized, or eliminated. While using the steam generated during sorption as a sweep gas reduces the amount of heat transfer, such steam still replaces steam that would otherwise have to be raised from another source. Thus, using a portion of the steam as a sweep gas can still provide substantial energy savings.

The target desorption temperature of the sorbent and/or the sorbent environment during a desorption step can vary depending on the nature of the sorbent. Generally, the desorption step can be performed at temperatures of the sorbent and/or in the sorbent environment of 100° C. to 200° C., or 100° C. to 180° C., or 100° C. to 160° C., or 100° C. to 140° C., or 120° C. to 200° C., or 120° C. to 180° C., or 120° C. to 160° C., or 140° C. to 200° C., or 140° C. to 180° C. In various aspects, the temperature of steam introduced into the one or more associated heat exchanger volumes during a desorption step can be 100° C. to 200° C., or 100° C. to 180° C., or 100° C. to 160° C., or 100° C. to 140° C., or 120° C. to 200° C., or 120° C. to 180° C., or 120° C. to 160° C., or 140° C. to 200° C., or 140° C. to 180° C.

The desorption of $CO_2$ can generally be performed at pressures at or above ambient in the sorbent environment. In some aspects, the total pressure in the sorbent environment during a sorption process can be 100 kPa-a or more, or 101 kPa-a or more, or 110 kPa-a or more, such as up to 1.0 MPa-a or possibly still higher. It is noted that the pressure in the sorbent environment may be substantially different from the pressure in the one or more associated heat exchanger volumes. This is due in part to the fact that condensation in the sorbent environment is generally not beneficial, while condensation in the associated heat exchanger volumes is beneficial for increasing the amount of heat available for transfer to the sorbent. Within the associated heat exchanger volume(s), the pressure during a desorption step can be 101 kPa-a to 1500 kPa-a, or 101 kPa-a to 1000 kPa-a, or 101 kPa-a to 750 kPa-a, or 101 kPa-a to 500 kPa-a, or 150 kPa-a to 1500 kPa-a, or 150 kPa-a to 1000 kPa-a, or 150 kPa-a to 750 kPa-a, or 150 kPa-a to 500 kPa-a, or 250 kPa-a to 1500 kPa-a, or 250 kPa-a to 1000 kPa-a, or 250 kPa-a to 750 kPa-a, or 500 kPa-a to 1500 kPa-, or 500 kPa-a to 1000 kPa-a. In some aspects, the pressure in the associated heat exchanger volume(s) during a desorption step can be greater than the pressure in the sorbent environment by 100 kPa or more, or 200 kPa or more, or 400 kPa or more, such as up to 1400 kPa or possibly still more.

In some aspects, the temperature and pressure of the steam introduced into the heat exchanger volumes can vary during a desorption step. Additionally or alternately, the temperature and pressure of the sweep gas can vary during a desorption step. For example, the temperature of the sorbent and/or sorbent environment at the beginning of a desorption step is typically lower than the target desorption temperature. This is due in part to the fact that sorption is generally performed at a temperature that is lower than the desorption temperature by 20° C. or more. Because the sorbent and/or sorbent environment are at a lower temperature at the start of the desorption step, a portion of the heating of the sorbent and sorbent environment can be performed using steam that is at a lower temperature than the target desorption temperature. In such an aspect, lower temperature steam can be used for a portion of the desorption step, with a switch to steam at or near the target desorption temperature for the final portion of the desorption step. Any convenient number of temperature increases in the steam flow can be used in order to further improve the efficiency of the desorption process. When using a plurality of temperatures for steam flow in the associated heat exchanger volumes during a desorption step, the pressure of the steam in the associated heat exchanger volumes can also be varied accordingly so that the steam remains at or near the condensation point during the desorption step. In aspects where a plurality of steam temperatures are used for the steam in the associated heat exchanger volumes in a desorption step, the difference between a first steam temperature and a second steam temperature can be 10° C. or more, or 20° C. or more, such as up to 80° C. or possibly still more.

Sorption/Desorption Cycle—Optional Purge and Cooling

After the desorption step, the temperature of the sorbent and/or sorbent environment can be reduced prior to the start of the next sorption step. Conventionally, cooling of the sorbent and sorbent environment can be performed using a purge gas. In some aspects, however, additional heat recovery can be performed by using introducing water into the associated heat exchanger volume(s) and creating steam. This can be accomplished in a manner similar to the raising of steam that is performed during the sorption step. Thus, the pressure in the heat exchanger volume can be adjusted to an appropriate pressure for forming steam from water at a target temperature for the end of the cooling step/the start of the sorption step. The additional steam generated during a cooling step can be used in any convenient manner, similar to the steam generated during a sorption step. To reduce cycle times, a purge gas flow (such as an $N_2$ gas flow or possibly an air gas flow) can also be passed through the sorbent environment during the cooling step. Such a gas flow can be at a temperature that is at or near the target temperature for the start of the sorption step.

In aspects where steam is generated in the associated heat exchanger volume(s) during a cooling step, the steam can be generated at a temperature of 30° C. to 180° C. If steam at a single temperature is generated, the steam will typically be generated at a temperature at or near the target temperature for the start of the next sorption step. Such steam can be generated at a temperature of 30° C. to 150° C., or 30° C. to 99° C., or 50° C. to 99° C., or 30° C. to 80° C., or 50° C. to 80° C., or 30° C. to 65° C., or 100° C. to 150° C., or 100° C. to 120° C., or 120° C. to 150° C. Optionally, steam at multiple temperatures could be generated during a cooling step. However, due to efficiency considerations for a process cycle, it is generally desirable for a cooling step to be a relatively small portion of the total time for a cycle.

Process Flow Example

FIG. 1 shows an example of an idealized process flow for the management of water and steam in associated heat exchanger volume(s) while performing a $CO_2$ sorption/desorption process cycle. In order to illustrate concepts, process values are shown in FIG. 1 for a sorption/desorption cycle based on a target sorption temperature of 85° C. and a target desorption temperature of 150° C. The state of water/steam in the process flow is shown at various locations. These locations are labeled as "Sx". The state information at the "Sx" locations includes the temperature of the water/steam flow, the pressure of the water/steam flow, and the mole fraction of the water/steam flow that corresponds to vapor (steam). A value of 0 for the bottom number means that only liquid water is present, while a value of 1.0 means that all of the water/steam flow corresponds to steam. The process flow illustrated in FIG. 1 shows only use of steam within associated heat exchanger volume(s). No steam is withdrawn from the heat pump system for use as a purge flow or temperature adjustment flow.

In the example shown in FIG. 1, an initial water flow 105 is provided in a state S1 at a temperature of 85° C. and 70 kPa-a. This pressure roughly corresponds to the boiling point for water at 90° C. The water flow 105 is provided at a temperature below 90° C. to reduce or minimize steam formation prior to passing the water flow into the associated heat exchanger volume(s) for the sorption step. The water flow 105 can be passed into heat exchanger volume(s) associated with a sorption process 110 in a first sorbent environment. The heat of sorption generated during the sorption step can be at least partially transferred to the water in the heat exchanger volumes. In the process flow shown in FIG. 1, the heat transfer from the sorption process 110 results in conversion of the initial water flow 105 into a steam flow 115. Steam flow 115 is in a state S2 at a temperature of 90° C. and a pressure of 70 kPa-a, where the mole fraction of steam in the flow is 0.99. It is noted that a portion of the heat generated during sorption step 110 was used to increase the temperature of the water/steam to 90° C.

In the example shown in FIG. 1, steam flow 115 is then passed into a liquid-vapor separation stage 120. The separation stage 120 is used to remove any remaining (liquid) water from steam flow 115 prior to compression. In the example shown in FIG. 1, separation stage 120 results in formation of a water flow 129 in a state S3 at a temperature of 88° C. and a pressure of 70 kPa-a. Separation stage 120 also results in formation of steam flow 125 in a state S4 that is substantially entirely in the vapor phase at a temperature of 88° C. and a pressure of roughly 65 kPa-a.

Steam flow 125 is then passed into compression stage 130. Based on the target desorption temperature of 150° C. for the example shown in FIG. 1, the compression stage is used to form a pressurized steam flow 135 at a pressure of 280 kPa-a (state S5). The resulting temperature for the steam flow from this compression is 303° C.

The compressed steam flow 135 is then passed into the associated heat exchanger volume(s) for a second sorbent environment that is performing a desorption step 140. In the example shown in FIG. 1, two separate heat exchange events are shown as corresponding to desorption step 140. The desorption step 140 is shown in this manner to illustrate the nature of what is happening, but it is understood that desorption step 140 corresponds to a single process. During desorption step 140, heat is transferred from steam flow 135 into the sorbent environment. A portion of the heat transfer reduces the temperature of the steam flow 135 from 303° C. to 150° C. This change in state is shown as S5. A second portion of the heat transfer corresponds to transferring the heat released by condensation of steam at 150° C. It is noted that as condensation also results in a loss of volume of the steam/water in the associated heat exchanger volume(s), due to the much smaller volume occupied by water as a condensed phase. Thus, as the steam condenses to release heat of condensation, some expansion cooling also occurs. Thus, the resulting water phase formed during the desorption step is at a lower temperature. In the example shown in FIG. 1, this is illustrated by state S6, which corresponds to the primarily water phase formed in the associated heat exchanger volume(s) after the desorption step. The water includes a small vapor phase (0.01 mol %), and is at a temperature of 127° C. and a pressure of 250 kPa-a.

After the desorption step, the water phase 145 is passed into a separation stage 150 that is operated at 70 kPa-a. This results in formation of a steam flow 155 at 90° C. and 70 kPa-a (state S7) and a water flow 159 at 90° C. and 70 kPa-a. In the example shown in FIG. 1, steam flow 155 is passed into separation stage 120 to provide further steam for use in a desorption step.

The configuration in FIG. 1 was simulated using a commercially available process modeling package to determine the relative energy consumption for capture and desorption of $CO_2$ from a stream containing 8.0 vol % $CO_2$. The heat transfer in the model was modeled as idealized heat transfer, so all of the heat of sorption was transferred to the water in the associated heat exchanger volume, and similarly the maximum possible heat was transferred back from the seam during the desorption step. The sorbent was modeled as an MEA-equivalent with a target sorption temperature of 90° C. and a desorption temperature of 150° C.

As a baseline for comparison, it is noted that a conventional amine scrubber that using monoethanol amine (MEA) as the $CO_2$ sorbent can be used for $CO_2$ capture from a flue gas produced by a natural gas combined cycle plant. It was previously determined that using an MEA amine tower to perform 90% $CO_2$ capture on 1 BCFD (billion cubic feed per day) of a flue gas containing 8.0 vol % $CO_2$ required roughly 225 MW of low pressure steam in order to release the $CO_2$ sorbed by the amine. It can be expected that a comparable amount of low pressure steam would be needed for performing $CO_2$ desorption using a similar amine in a sorbent bed configuration.

In the modeling of the heat transfer during $CO_2$ capture in a configuration similar to FIG. 1, during the sorption step, the sorption generates 108 MW (per day) of heat. In the model, it was assumed that 100% of this heat was transferred to the water in the associated heat exchanger volume to make steam at 90° C. and 70 kPa-a. Compressing this steam to 280 kPa-a required 21 MW of electrical power. Since electrical power is often generated using steam turbines, it was conservatively assumed that this 21 MW of electrical power corresponds to consumption of 42 MW of low pressure steam. The steam at 280 kPa-a and 303° C. was then used to provide heat for a desorption step at 150° C. The steam was able to provide a total of 127 MW of heat for the desorption step; 15 MW corresponded to the heat provided by cooling the seam from 303° C. to 150° C. The remaining 112 MW corresponded to the heat released by condensation of the steam at 280 kPa-a and 150° C. Thus, based on the modeling, by spending 42 MW of steam to provide energy for compression, the heat exchanger was able to replace 127 MW of low pressure steam. This is a net savings of 85 MW, or roughly 38% of the total steam requirements for the conventional process. It is understood that this is an idealized example, and that actual heat transfer between the sorbent and the associated heat exchanger volumes will typically be less than 100% of the available heat. However, even with some losses due to heat transfer to the sorbent environment, substantial energy savings can be realized.

Sorbent Environment and Heat Exchanger Volumes

In various aspects, any convenient type of sorbent structure can be used, so long as one or more heat exchanger volumes can be provided in thermal proximity to the sorbent in the sorbent environment. Examples of sorbent configurations can include, but are not limited to, beds of sorbent particles and/or particles that support a sorbent; monoliths formed from a sorbent material and/or that support a sorbent material on/in accessible surfaces; metal or plastic internals of a vessel, such as tubes, which are coated with sorbent; and hollow fiber contactors formed from a sorbent material and/or that support a sorbent material.

The heat exchanger volumes can be integrated with the sorbent environment in any convenient manner. For example, for a sorbent configuration corresponding to a bed of particles, one option can be to incorporate heat exchanger tubes within the bed of particles. In this type of option, the heat exchanger volume(s) are at least partially contained within the sorbent environment. Another option can be to form the bed of particles within a closed volume, with a heat exchanger volume surrounding the bed of particles. In this type of option, the sorbent environment is at least partially contained within the heat exchanger volume.

As another example, for a hollow fiber contactor, the inner lumen of the fiber can be sealed relative to the fiber, so that the inner volume of the fiber can be used as a heat exchanger volume. As still another example, a monolith type sorbent structure can correspond to a monolith that includes a plurality of channels. For such a monolith, a portion of the channels can be used as heat exchanger volumes.

The sorbent material can correspond to a sorbent that provides sorption capacity for $CO_2$. Examples of sorbent materials include, but are not limited to, amine-based sorbents, polymeric materials, metal organic frameworks (MOFs), zeotype materials, activated charcoal, porous aromatic framework materials, covalent organic framework materials, porous organic polymers, and cage materials, or combinations thereof. As an example, polyamines are examples of both amine-based sorbents and polymeric sorbents. As another example, MOF-274 is a MOF material with $CO_2$ sorption capacity. It is noted that additional $CO_2$ sorption capacity can be added to some MOF materials by appending di-amines to the MOF. It is noted that combinations of materials can potentially be used to form a sorbent structure. For example, a sorbent bed can be formed by first forming particles of a polymeric material with sorbent capacity for $CO_2$, followed by impregnating the particles with another sorbent, such as a metal organic framework material.

Configuration Example

Figure 2:
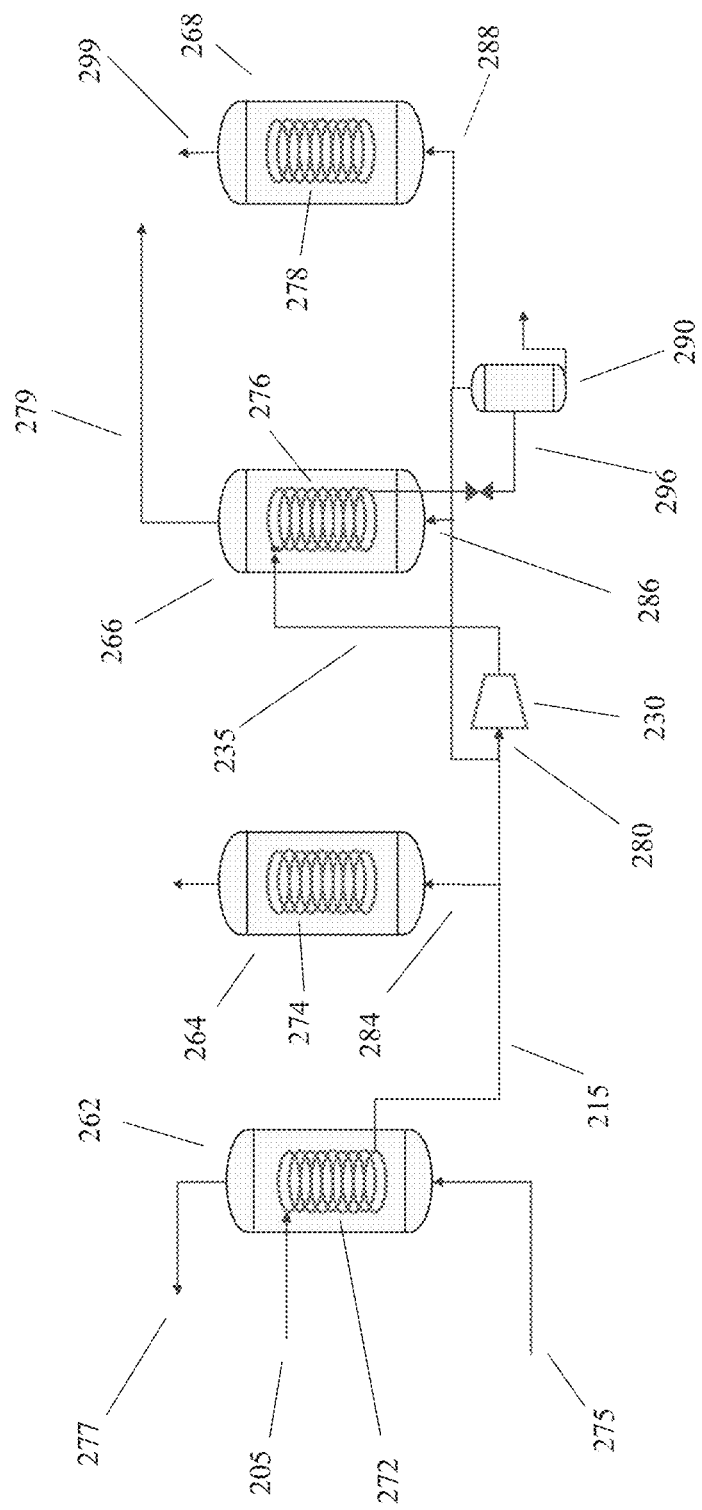
FIG. 2 shows an example of a configuration for a $CO_2$ sorption/desorption system that includes integrated heat exchanger volumes.

FIG. 2 shows an example of a potential configuration for performing a $CO_2$ sorption/desorption cycle with an integrated heat pump. In FIG. 2, the sorbent corresponds to a bed of MOF particles. The MOF particles correspond to 3-4-3 $Mg_2$(4,4'-dioxidobiphenyl-3,3'-dicarboxylate)(tetraamine).

In the example shown in FIG. 2, a plurality of sorbent beds are shown, with each sorbent bed housed in a separate sorbent environment. The example shown in FIG. 2 displays four sorbent beds, but it is understood that any convenient number could be used. The heat exchanger volume for each sorbent bed corresponds to a spiral conduit within the sorbent environment.

Based on the MOF sorbent used in this example, the target sorption temperature for the sorbent is 110° C. and the target desorption temperature is 155° C. Performing sorption at 110° C. allows roughly half of the $CO_2$ sorbent capacity of the sorbent to be available (roughly 1.5 mmol $CO_2$ per gram of MOF). At the desorption temperature of 155° C., roughly 95% desorption can be achieved.

In the configuration shown in FIG. 2, a plurality of vessels containing sorbent beds of MOF particles are shown. The vessels represent sorbent beds at different stages in the sorption/desorption process cycle. Sorbent bed 262 depicts a bed during sorption step. Sorbent bed 264 depicts a bed during a purge step. Sorbent bed 266 corresponds to a sorbent bed during a desorption step. Sorbent bed 266 illustrates the flow of steam into the associated heat exchanger volumes for the desorption step. Sorbent bed 268 corresponds to a sorbent bed after the desorption step but prior to a sorption step, during a purge and/or cool down step. Each sorbent bed 262, 264, 266, and 268 is shown as having an associated heat exchanger volume 272, 274, 276, and 278, respectively.

In FIG. 2, a $CO_2$-containing flue gas 275 is passed into sorbent bed 262 during a sorption step. $CO_2$ is captured from the flue gas, resulting in formation of a $CO_2$-depleted exhaust gas 277. During the sorption step, water 205 is passed into heat exchanger volume 272 that is associated with sorbent bed 262. Based on the target sorption temperature of 110° C., water 205 is passed into associated heat exchanger volume 272 at 100° C. and a pressure of 150 kPa-a. The pressure is selected so that the boiling point of water at the pressure in the associated heat exchanger volume corresponds to the target sorption temperature. As sorption occurs within sorbent bed 262, heat is transferred to the water in associated heat exchanger volume 272, resulting in formation of low pressure steam 215. In the example shown in FIG. 2, the low pressure steam has a temperature of 110° C. and a pressure of 150 kPa-a.

In the example configuration shown in FIG. 2, a portion 284 of low pressure steam 215 is used as a purge gas for a second sorbent environment corresponding to sorbent bed 264. The purge is performed after the sorption step and prior to the desorption step.

Another portion 280 of low pressure steam 215 is passed into compression stage 230, where the steam is compressed to 600 kPa-a. This pressure is selected to match the target desorption temperature during the desorption step. The resulting pressurized steam 235 is passed into heat exchanger volume 276 that is associated with sorbent bed 266. This allows for transfer of heat from the steam to sorbent bed 266 during the desorption step. The condensed water 296 formed during the desorption step can be passed into a separator 290 to allow for recovery of any remaining low pressure steam prior to recycling the water for further use in the heat exchanger volumes. Optionally, a portion 286 of low pressure steam 215 can be used as a sweep gas during the desorption step. The desorption of $CO_2$ results in formation of a $CO_2$ desorption flow 279.

The remaining portion 288 of low pressure steam 215 is passed into sorbent bed 288 as a sweep gas after a desorption step to form a sweep exhaust 299. The sweep gas can also assist with returning sorbent bed 288 to the target pressure for $CO_2$ sorption prior to the start of the next sorption step.

Additional Embodiments

Embodiment 1. A method for performing a $CO_2$ sorption/desorption cycle, comprising: exposing $CO_2$ to a sorbent in a first sorbent environment to sorb $CO_2$ and generate heat at a sorption temperature; transferring at least a portion of the heat generated at the sorption temperature to water in one or more first heat exchanger volumes associated with the first sorbent environment to form steam at the sorption temperature; compressing at least a portion of the steam to form pressurized steam; passing at least a portion of the pressurized steam into one or more second heat exchanger volumes associated with a second sorbent environment; condensing the at least a portion of the pressurized steam in the second heat exchanger volumes at a desorption temperature to form water and generate heat at the desorption temperature; and transferring at least a portion of the heat generated at the desorption temperature to a sorbent in the second sorbent environment to desorb $CO_2$.

Embodiment 2. The method of Embodiment 1, wherein the desorption temperature is greater than the sorption temperature by 20° C. or more.

Embodiment 3. The method of any of the above embodiments, wherein the sorption temperature is 30° C. to 99° C., the pressure in the one or more first heat exchanger volumes being less than 100 kPa-a during the transferring at least a portion of the heat generated at the sorption temperature, and wherein the pressure in the first sorbent environment is 100 kPa-a or more during the transferring at least a portion of the heat generated at the sorption temperature.

Embodiment 4. The method of Embodiment 3, wherein the sorption temperature is 30° C. to 90° C.

Embodiment 5. The method of any of the above embodiments, wherein the desorption temperature is 100° C. to 200° C.

Embodiment 6. The method of any of the above embodiments, wherein the desorption temperature is 120° C. to 200° C., the pressure in the one or more second heat exchanger volumes being 150 kPa-a or more during the transferring at least a portion of the heat generated at the desorption temperature, the pressure in the first sorbent environment optionally being 100 kPa-a or more during the transferring at least a portion of the heat generated at the desorption temperature.

Embodiment 7. The method of any of the above embodiments, wherein the one or more first heat exchanger volumes are at least partially contained within the first sorbent environment, or wherein the one or more second heat exchanger volumes are contained within the second sorbent environment, or a combination thereof.

Embodiment 8. The method of any of Embodiments 1 to 6, wherein the one or more first heat exchanger volumes at least partially contain the first sorbent environment, or wherein the one or more second heat exchanger volumes contain the second sorbent environment, or a combination thereof.

Embodiment 9. The method of any of the above embodiments, wherein the method further comprises purging a third sorbent environment with a purge gas, the purge gas comprising a portion of the steam formed at the sorption temperature.

Embodiment 10. The method of any of the above embodiments, wherein compressing at least a portion of the steam to form pressurized steam comprises: compressing the at least a portion of the steam to form low pressure steam having a pressure of 100 kPa-a to 200 kPa-a, and compressing at least a portion of the low pressure steam to form the pressurized steam, the pressurized steam having a pressure of 200 kPa-a to 1000 kPa-a.

Embodiment 11. The method of any of the above embodiments, wherein the method further comprises purging a third sorbent environment with a purge gas, the purge gas comprising a portion of the low pressure steam, the purging being performed after a sorption step and prior to a desorption step.

Embodiment 12. The method of any of the above embodiments, wherein the method further comprises cooling a fourth sorbent environment with a temperature adjustment flow, the temperature adjustment flow comprising a portion of the low pressure steam.

Embodiment 13. The method of claim 1, wherein the sorbent comprises a sorbent supported on a monolith, or wherein the sorbent comprises particles of sorbent, or wherein the sorbent comprises sorbent supported on particles of a support material, or a combination thereof.

Embodiment 14. The method of any of the above embodiments, i) wherein there is no fluid communication between the first sorbent environment and the one or more first heat exchanger volumes associated with the first sorbent environment during the exposing $CO_2$ to the sorbent and during the transferring at least a portion of the heat generated at the sorption temperature; ii) wherein there is no fluid communication between the second sorbent environment and the second heat exchanger volumes during the passing at least a portion of the pressurized steam into one or more second heat exchanger volumes, during the condensing the at least a portion of the pressurized steam in the second heat exchanger volumes, and during the transferring at least a portion of the heat generated at the desorption temperature to a sorbent in the second sorbent environment; or iii) a combination of i) and ii).

Embodiment 15. The method of any of the above embodiments, wherein the method further comprises heating the at least a portion of the steam prior to compressing the at least a portion of the steam to form the pressurized steam.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

The invention claimed is:

1. A method for performing a $CO_2$ sorption/desorption cycle, comprising:
   exposing $CO_2$ to a sorbent in a first sorbent environment to sorb $CO_2$ and generate heat at a sorption temperature;
   transferring at least a portion of the heat generated at the sorption temperature to water in one or more first heat exchanger volumes associated with the first sorbent environment to form steam at the sorption temperature;
   compressing at least a portion of the steam to form pressurized steam;
   passing at least a portion of the pressurized steam into one or more second heat exchanger volumes associated with a second sorbent environment;
   condensing the at least a portion of the pressurized steam in the second heat exchanger volumes at a desorption temperature to form water and generate heat at the desorption temperature; and
   transferring at least a portion of the heat generated at the desorption temperature to a sorbent in the second sorbent environment to desorb $CO_2$.

2. The method of claim 1, wherein the desorption temperature is greater than the sorption temperature by 20° C. or more.

3. The method of claim 1, wherein the sorption temperature is 30° C. to 99° C., the pressure in the one or more first heat exchanger volumes being less than 100 kPa-a during the transferring at least a portion of the heat generated at the sorption temperature.

4. The method of claim 3, wherein the pressure in the first sorbent environment is 100 kPa-a or more during the transferring at least a portion of the heat generated at the sorption temperature.

5. The method of claim 3, wherein the sorption temperature is 30° C. to 90° C.

6. The method of claim 1, wherein the desorption temperature is 100° C. to 200° C.

7. The method of claim 1, wherein the desorption temperature is 120° C. to 200° C., the pressure in the one or more second heat exchanger volumes being 150 kPa-a or more during the transferring at least a portion of the heat generated at the desorption temperature.

8. The method of claim 7, wherein the pressure in the first sorbent environment is 100 kPa-a or more during the transferring at least a portion of the heat generated at the desorption temperature.

9. The method of claim 1, wherein the one or more first heat exchanger volumes are at least partially contained within the first sorbent environment, or wherein the one or more second heat exchanger volumes are contained within the second sorbent environment, or a combination thereof.

10. The method of claim 1, wherein the one or more first heat exchanger volumes at least partially contain the first sorbent environment, or wherein the one or more second heat exchanger volumes contain the second sorbent environment, or a combination thereof.

11. The method of claim 1, wherein the method further comprises purging a third sorbent environment with a purge gas, the purge gas comprising a portion of the steam formed at the sorption temperature.

12. The method of claim 1, wherein compressing at least a portion of the steam to form pressurized steam comprises:
   compressing the at least a portion of the steam to form low pressure steam having a pressure of 100 kPa-a to 200 kPa-a, and
   compressing at least a portion of the low pressure steam to form the pressurized steam, the pressurized steam having a pressure of 200 kPa-a to 1000 kPa-a.

13. The method of claim 12, wherein the method further comprises purging a third sorbent environment with a purge gas, the purge gas comprising a portion of the low pressure steam.

14. The method of claim 13, wherein the purging is performed after a sorption step and prior to a desorption step.

15. The method of claim 12, wherein the method further comprises cooling a fourth sorbent environment with a temperature adjustment flow, the temperature adjustment flow comprising a portion of the low pressure steam.

16. The method of claim 1, wherein the sorbent comprises a sorbent supported on a monolith.

17. The method of claim 1, wherein the sorbent comprises particles of sorbent, or wherein the sorbent comprises sorbent supported on particles of a support material, or a combination thereof.

18. The method of claim 1, wherein there is no fluid communication between the first sorbent environment and the one or more first heat exchanger volumes associated with the first sorbent environment during the exposing $CO_2$ to the sorbent and during the transferring at least a portion of the heat generated at the sorption temperature.

19. The method of claim 1, wherein there is no fluid communication between the second sorbent environment and the second heat exchanger volumes during the passing at least a portion of the pressurized steam into one or more second heat exchanger volumes, during the condensing the at least a portion of the pressurized steam in the second heat exchanger volumes, and during the transferring at least a portion of the heat generated at the desorption temperature to a sorbent in the second sorbent environment.

20. The method of claim 1, wherein the method further comprises heating the at least a portion of the steam prior to compressing the at least a portion of the steam to form the pressurized steam.

* * * * *